United States Patent [19]

Yamamori et al.

[11] Patent Number: 4,482,701

[45] Date of Patent: Nov. 13, 1984

[54] HYDROLYZABLE POLYESTER RESINS, VARNISHES AND COATING COMPOSITIONS CONTAINING THE SAME

[75] Inventors: Naoki Yamamori, Minoo; Junji Yokoi; Motoyoshi Yoshikawa, both of Nara, all of Japan

[73] Assignee: Nippon Paint Co., Ltd., Japan

[21] Appl. No.: 426,155

[22] Filed: Sep. 28, 1982

[30] Foreign Application Priority Data

Oct. 17, 1981 [JP] Japan ................................ 56-165921
Oct. 17, 1981 [JP] Japan ................................ 56-165922
Oct. 17, 1981 [JP] Japan ................................ 56-165923

[51] Int. Cl.$^3$ ............................................ C08G 63/60
[52] U.S. Cl. .................................. 528/295.5; 528/296; 528/302; 528/303; 528/304; 528/305; 528/361; 525/938; 260/DIG. 43; 524/603
[58] Field of Search .................... 528/295.5, 296, 302, 528/303, 304, 305, 361; 260/DIG. 43; 525/938

[56] References Cited

U.S. PATENT DOCUMENTS

| | | | |
|---|---|---|---|
| 2,985,624 | 5/1961 | Arndt | 528/302 |
| 3,053,783 | 9/1962 | Broadhead | 528/296 |
| 3,057,826 | 10/1962 | Griffing | 528/296 |
| 3,075,936 | 1/1963 | Bolton | 528/296 |
| 3,318,763 | 5/1967 | Brooks | 524/201 |
| 3,725,327 | 4/1973 | Stearns | 524/202 |
| 3,761,450 | 9/1973 | Herwig | 528/296 |
| 4,036,908 | 7/1977 | Chretien | 528/307 |
| 4,128,429 | 12/1978 | Wyant | 524/178 |
| 4,130,432 | 12/1978 | Wehner | 524/178 |
| 4,277,392 | 7/1981 | Feldman | 528/303 |
| 4,282,126 | 8/1981 | Rodgers | 524/178 |

Primary Examiner—John C. Bleutge
Assistant Examiner—Patricia Short
Attorney, Agent, or Firm—Wenderoth, Lind & Ponack

[57] ABSTRACT

Preparation of hydrolyzable polyester resin comprising reacting polycarboxylic acid and polyhydric alcohol components, which is characterized by using, as at least part of said polyhydric alcohol component, a metallic salt of hydroxy carboxylic acid of the formula defined and effecting the polycondensation at a temperature which is no more than the decomposition temperature of said metallic salt. The polyester resins are useful as resinous vehicle of varnishes and antifouling paints.

16 Claims, No Drawings

HYDROLYZABLE POLYESTER RESINS, VARNISHES AND COATING COMPOSITIONS CONTAINING THE SAME

FIELD OF INVENTION

The present invention relates to a preparation of hydrolyzable polyester resins, and varnishes and coating compositions containing the same.

BACKGROUND OF THE INVENTION

Polyester resins derived from polycarboxylic acids and polyhydric alcohols have been widely used as resinous vehicle in coatings, because an excellent film with toughness and other desirable properties can be obtained therefrom. Irrespective of the polymerization degree, the ester bondings contained are resistive against hydrolysis, which, in turn, is believed to be one of the reasons and advantages of using this polymer as resinous component.

In coatings, and especially in ship's bottom paint, if the coated surface is full of undulations and is gradually hydrolyzed or dissolved in sea water during sailing, thereby resulting a comparatively flat bottom surface, fuel cost could be greatly reduced and furthermore, the tendency for the sea life such as acorn shells or the like to stick to the bottom of ship would be greatly reduced. Therefore hydrolyzable resinous materials have become the object of public attention in recent years. However, very unfortunately, attempts at employing such material have all ended in failure partly due to the two conflicting requirements of moderate stabilization and gradual decomposition of the material in sea water.

Polyester is, as is well known, composed of water soluble polyhydric alcohol and polycarboxylic acid which is also relatively soluble in water due to the presence of polar carboxyl groups. Therefore, if something is devised to decompose said polymer into lower molecular segments or its constitutional components, then the so-called self-polishing would be realized with this material. The inventors, having the above in mind, have made endeavors to obtain a polyester which is relatively stable in water, but is decomposed or hydrolyzed gradually under sailing conditions. Surprisingly, it was found that in the preparation of polyester by the polycondensation of polycarboxylic acid and polyhydric alcohol components, if a polyhydric alcohol having the metal ester bonding of the formula

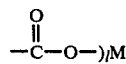

wherein M stands for metallic element and l is an integer corresponding to the valency of said metal M, is used as at least part of said polyhydric alcohol component, a number of said metal-ester bondings can be introduced into the polyester chain, and the thus obtained polyester is very stable against hydrolysis under neutral conditions, but is gradually decomposed and hydrolyzed under weak alkaline conditions, at the sites of said metal-ester bondings, thereby liberating metal ions and giving water soluble segments with carboxyl groups. Sea water and sailing will offer optimum hydrolysis conditions for this polymer. On the basis of these findings, the inventors have completed the invention.

SUMMARY OF THE INVENTION

This invention provides a process for preparing a hydrolyzable polyester resin comprising reacting polycarboxylic acid and polyhydric alcohol components, which is characterized in that a metallic salt of hydroxy carboxylic acid of the formula (I)

wherein R is a hydrocarbon residue or residue of a half ester of a dicarboxylic acid; M stands for monovalent to tetravalent metal belonging to either one of the groups Ia,Ib,IIa,IIb,IVa,VIIb and VIII of the Periodic Table; and l is an integer corresponding to the valency of said metal M, is used as at least part of said polyhydric alcohol and the polycondensation is effected at a temperature which is no more than the decomposition temperature of said metallic salt of hydroxy carboxylic acid. The invention also provided varnishes and coating compositions containing the abovesaid polyesters.

DESCRIPTION OF THE PREFERRED EMBODIMENTS

For the preparation of the present polyesters, any of the acids having 2 or more functional carboxylic groups, known as polycarboxylic acids, may be satisfactorily used. Examples of such acids are straight chain dicarboxylic acids as oxalic acid, succinic acid, succinic anhydride, adipic acid, azelaic acid and sebasic acid; aromatic acids as phthalic acid, phthalic anhydride, isophthalic acid, terephthalic acid, tetrahydrophthalic anhydride, hexahydrophthalic acid, hexahydrophthalic anhydride, tetrabromophthalic anhydride, trimellitic acid, trimellitic anhydride, pyromellitic acid and pyromellitic anhydride; and unsaturated dicarboxylic acids as maleic acid, maleic anhydride, fumaric acid and itaconic acid. If desired, monocarboxylic acid as benzoic acid, p-t-butyl benzoic acid, and various fatty acids of animal and vegetable fats and oils may be added as molecular regulator.

However, in the present invention, at least part of polyhydric alcohol to be reacted with said polycarboxylic acid must be a metal salt of hydroxy acid of the formula (I)

wherein R is a hydrocarbon residue or residue of a half ester of a dicarboxylic acid, M stands for monovalent to tetravalent metal belonging to anyone of the groups Ia (e.g. Li, K, Na), Ib (e.g. Cu, Ag), IIa (e.g. Mg, Ca, Ba), IIb (e.g. Zn, Cd, Hg), IVa (e.g. Sn, Pb), VIIb (e.g. Mn) and VIII (e.g., Fe, Co, Ni) of the Periodic Table; and l is an integer corresponding to the valency of said metal M.

The hydrocarbon residue may be of the saturated or unsaturated, straight or branched, aliphatic or aromatic type.

More specifically, said hydrocarbon residue may take either one of the following forms.

(1) Saturated aliphatic hydrocarbon residues of the formula:

in which a is an integer from 1 to 38.

Among them, special preference is given to the subgroup members of the formula:

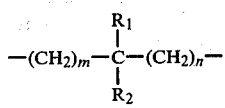

in which $R_1$ and $R_2$ each represents a member selected from hydrogen atom, alkyl having 1 to 10 carbon atoms and alkene having 2 to 10 carbon atoms, and m and n each is 0 or an integer from 1 to 16. Most preferably, said $R_1$ and $R_2$ each stands for hydrogen atom or alkyl having 1 to 8 carbon atoms, and m and n each is 0 or an integer from 1 to 10. Examples of hydroxy carboxylic acids of this type are lactic acid, hydracrylic acid, 12-hydroxy stearic acid and glycolic acid.

(2) Unsaturated aliphatic hydrocarbon residues of the formula:

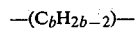

in which b is an integer from 2 to 38.

Among them, special preference is given to the subgroup members of the formula:

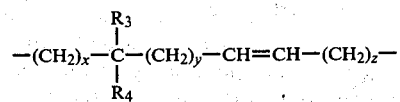

in which $R_3$ and $R_4$ each represents a member selected from hydrogen atom, alkyl having 1 to 10 carbon atoms and alkene having 2 to 10 carbon atoms, and x, y and z each is 0 or an integer from 1 to 10. Most preferably, said $R_3$ and $R_4$ each represents a member selected from hydrogen atom and alkyl having 1 to 8 carbon atoms, x is 0 or an integer from 1 to 4, y is 0 or an integer from 1 to 6 and z is 0 or an integer from 1 to 10. Examples of hydroxy carboxylic acids of this type are ricinoleic acid and ricinoelaidic acid. The residue of the half ester of a dicarboxylic acid may take either one of the following forms:

(1) Residues of half esters of aliphatic dicarboxylic acids of the formula:

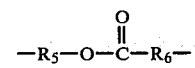

in which $R_5$ is a member selected from alkylene having 1 to 8 carbon atoms and ether bonding bearing alkylene having 4 to 8 carbon atoms, and $R_6$ is a member selected from saturated and unsaturated alkylenes having 2 to 4 carbon atoms.

Examples of hydroxy carboxylic acids of this type are half esters of aliphatic dicarboxylic acids such as maleic anhydride, succinic anhydride, dimethyl maleic anhydride, dimethyl succinic anhydride and the like, with polyols such as ethylene glycol, propylene glycol, 1,3-butylenediol, 1,6-hexanediol, diethylene glycol, dipropylene glycol, neopentyl glycol, triethylene glycol and the like.

(2) Residues of half esters of saturated or unsaturated cyclic dicarboxylic acids of the formula:

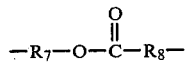

in which $R_7$ is a member selected from alkylene having 1 to 8 carbon atoms and ether bonding bearing alkylene having 4 to 8 carbon atoms, and $R_8$ is a member selected from saturated and unsaturated cyclic hydrocarbons having 6 to 7 carbon atoms.

Examples of hydroxy carboxylic acids of this type are half esters of such dicarboxylic acids as phthalic anhydride, tetrahydrophthalic anhydride, hexahydrophthalic anhydride, himic anhydride and the like, with polyols as ethylene glycol, propylene glycol, 1,3-butylenediol, 1,6-hexanediol, diethylene glycol, dipropylene glycol, neopentyl glycol, triethylene glycol and the like.

From the economical and effectual viewpoint, particularly preferred members are lactic acid, glycolic acid, hydracrylic acid and 12-hydroxystearic acid.

Most of these metallic salts of hydroxy carboxylic acids per se have been known and however, they can easily be prepared, as hereinafter stated, by the reaction of corresponding hydroxy carboxylic acid with the oxide, hydroxide or carbonate of the desired metal, as desired.

Though the metal can be any one belonging to the abovesaid groups, it may, for coating purposes, preferably be selected from K, Na, Cu, Ag, Mg, Zn, Sn, Pb, Fe, Co and Ni, and particular preference is given to Na, Cu, Mg, Zn, and Ni. Of course, the invention can never be limited to these members, and any of the metallic salts of hydroxy carboxylic acids represented by the aforesaid formula may satisfactorily be used. As already stated, they are, singularly or in combination form, used as the whole or a part of the polyhydric alcohol component. When M represents monovalent metal ($\Omega = 1$), the metal salt must be, as a matter of course, used together with other polyhydric alcohols for the polycondensation. When used, these polyhydric alcohols, other than the present metallic salt of hydoxy carboxylic acid, may be of any type customarily used for the preparation of polyester resin, including glycols as ethylene glycol, propylene glycol, 1,3-butylenediol, 1,6-hexanediol, diethyleneglycol, neopentylglycol, dipropylene glycol and triethyleneglycol; hydrogenated bisphenol A, bisphenol dihydroxy propyl ether, glycerol, trimethylol ethane, trimethylol propane, pentaerythritol and the like. The polyester of the present invention can be advantageously prepared by reacting the abovesaid components in an adequate inert solvent, with or without catalyst, at an elevated temperature, while removing the formed water therefrom, and no particular technique or operation is needed in connection with the employment of said metallic salt. However, said metallic salts of hydroxy carboxylic acids are, in general, insoluble in ketons and aromatic solvents. Therefore, in a preferred embodiment of the present invention, the metallic salt of hydroxy carboxylic acid is first added to the polycarboxylic acid and the mixture is heated while removing the formed water therefrom. When an acid anhydride is used, the mixture may be merely heated and fused together. At this time, in order to avoid local excessive heating, an aromatic solvent as toluene, xylene and the like may preferably be used and the heating is effected at around the melting point of said polycarboxylic acid. Next, a catalyst customarily used for the preparation of polyester as, for example, dibutyl tin oxide or lithium naphthenate, is added, with an optional polyol or a solvent, to the system and esterification is effected at an elevated temperature. At an excessively higher temperature, there is a fear of the metallic salt of hydroxy carboxylic acid used being decomposed, and therefore, the reaction should be carried out at a temperature lower than the decomposition temperature of said metallic salt. Most of the abovementioned metallic salts of hydroxy carboxylic acids will be decomposed, excepting alkali metal salts, at around 200° C. and over, and hence, the reaction should preferably be carried out at about 160° C. to 180° C. There is, however, such case that the decomposition temperature is far less than the abovementioned range as in Pb and Mn salts, and therefore, the actual temperature should be selected in an optimum range depending on the type of metallic salt used.

The progress of polycondensation may be traced by checking the amount of water generated and the acid value of the product produced. In order to obtain the polymer product for coating use, polymerization should preferably be stopped at a relatively earlier stage, thereby producing a lower molecule, solvent soluble type product. The degree of polycondensation, optimum molecular weight of the polymer, and control of said reaction are, however, patent to those skilled in the art and hence, no additional explanation would be required. Thus, the end point of the reaction is customarily determined by checking the amount of water generated, acid value of the product or the like, and after completion of the reaction, the mixture is diluted with an organic solvent such as aromatic hydrocarbons (e.g. toluene, xylene), ketones (e.g. methylethylketone, methyl isobutyl ketone), esters (e.g. ethyleneglycol monoethyl ether acetate, butyl acetate, ethyl acetate), alcohols (e.g. n-butyl alcohol, isobutyl alcohol, sec-butyl alcohol), ethers (e.g. 1,4-dioxane, tetrahydrofuran) and mixtures thereof to the desired solid content and used as resinous vehicle or varnish as it is.

According to the method of this invention, it is also possible to prepare a hydrolyzable polyester with higher molecular weight, which is, as hereinafter stated, likewise useful for coating purposes. Therefore, the term "polyester resin" as used herein should be taken as including both the product with a comparatively lower molecular weight, e.g. number-average molecular weight of about 500 to 10000 which is particularly useful in coating compositions (most preferably from 800 to 6000), and products with far higher molecular weight. The polyester resin according to the present invention is, regardless of the polymerisation degree thereof, characterized by having in the backbone a number of metal-ester bondings of the formula:

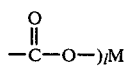

(M and l are as defined above) being inert to water under neutral conditions but liable to be hydrolyzed at the above mentioned metal-ester bondings under weak alkaline conditions as in the soil and sea water, thereby liberating the metal ions and giving lower molecular, water soluble polymer segments with carboxylic groups. This hydrolysis rate, in other words solubilization rate, may vary with the nature and amount of metal salt of hydroxy carboxylic acid contained and with the acid and hydroxyl values of the polyester resin. It has also close connection with the type of metal selected. For example, at an equivalent concentration, the hydrolysis rates may vary with the metals as follows:

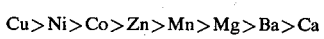

Thus, the hydrolysis is, in fact, inversely proportional to the ionization potential of metal.

The amount of said metallic salt in polyester resin is directly connected to the hydrolysis rate and the more the metallic salt content, the more the hydrolysis effect. It has also been confirmed that the solubility of polyester resin can be improved by increasing the acid and hydroxyl values of said resin.

Thus, according to the invention, it is possible to control solubilization of polyester resin and provide a tailor-made hydrolyzable polyester resin as occasion calls for.

The invention has been explained in connection with the best mode of practice thereof. However, since the characteristic feature of the invention resides in the point that in preparing a polyester resin comprising reacting polycarboxylic acid and polyhydric alcohol components, a metallic salt of hydroxy carboxylic acid of the aforesaid formula (I) is used as at least part of said polyhydric alcohol component and the polycondensation is effected at a temperature which is no more than the decomposition temperature of said hydroxy acid, the present process may advantageously be carried out in the other ways. For example, a certain degree of polycondensation is first carried out with polycarboxylic acid and polyhydric alcohol, and the desired amount of metallic salt of hydroxy carboxylic acid is added and esterification is further continued to obtain the hydrolyzable polyester resin. Furthermore, as in the conventional polyester resins, modifications with various fatty acids or resinous materials may be freely practiced. Thus obtained polyester resins are, because of the presence of hydrolyzable metal-ester bondings, very useful as resinous vehicle in varnishes and coating compositions. As already stated, in a comparatively lower molecular weight in the order of 500 to 10000 (number-average), the resin is soluble in a common organic solvent such as toluene, xylene, tetrahydrofuran, methyl isobutyl ketone, butyl acetate and the like, and is compatible with various other resinous solutions. The film-forming property of this polymer can be advantageously utilized as a resinous vehicle in a varnish and coating composition. However, even if the polymer is insoluble in said organic solvent because of its higher molecular weight, the polymer can be dispersed or mixed with solvents or other film-forming resinous materials. In either case, the polyester per se is very stable in neutral conditions, but is gradually hydrolyzed and decomposed under weak alkaline conditions. As coatings for marine structures, ship's bottoms, fishing nets and the like, it has long been believed that the employed resinous material should be resistive to the surrounding atmosphere. However, from the standpoint of economy of natural resources, the situation has taken a new turn recently.

If a coating, while being stable under normal conditions, is gradually decomposed or dissolved out in certain circumstances, a far better ultimate object would be often realized with said coating. For example, in the area of a ship's bottom, if the coating is gradually decomposed or dissolved out in sea water under weak alkaline conditions, the coating whose surface is full of undulations when coated, would gradually become smooth and flat surface in proportion to the amount sailing because the protruded portions are very highly and selectively hydrolyzed by sea water and the cost of fuel and sailing speed would be greatly improved accordingly. If a toxic substance can be liberated from the coating, it would be effective for the control of submarine life such as acorn shells or the like. Also in the agricultural field, if a capsule for agricultural chemicals can be made of such polymer capable of being gradually decomposed or dissolved out in soil (alkaline conditions), then various chemicals may be utilized at any desired times and stages of farming. The present polyester gives a sufficient answer to these propositions. That is, the hydrolyzable polyester resin of this invention is stable under neutral conditions, but is gradually decomposed and dissolved in water under weak alkaline conditions. At the same time, an amount of metal can be liberated in the form of metal ions. If the metal is selected from comparatively toxic substances as Cu, Pb, Zn and Sn, they would be effective for the control of submarine life, and when the metal is selected from such members as Mg, Mn, Zn, Cu, Mo, Fe and other trace elements, they would be advantageously utilized as growth elements for growing plants.

Since the hydrolysis rate and metal source can be controlled as desired, the present polyester is very useful as, for example, resinous vehicle in varnishes and coating compositions, film-forming material and other uses.

In formulating varnish or coating compositions with the present polyester resin, any of the conventional techniques may be satisfactorily used as they are. As a solvent, any of the common organic solvents may be used, including aromatic hydrocarbons (e.g. toluene, xylene), ketones (e.g. methyl ethyl ketone, methyl isobutyl ketone), esters (e.g. ethyleneglycol monoethyl ether acetate, butyl acetate), alcohols (e.g. butylalcohol), ethers (e.g. 1,4-dioxane, tetrahydrofuran) and the like. However, since the solvent needs not completely dissolve the resinous material, various other solvents employed in the coating area may be satisfactorily used. If desired, the solvent can be a monomer or other resinous varnish. It is of course possible to add conventional coloring matter, coating additives or the like with the composition of this invention. From the foregoing, it would be clear that one of the most attractive usages of the present polyester is the formation of ship's bottom paint, and especially antifouling paint. For the economy of fuel consumption and maintenance of sailing speed, the paint may be formulated only with the present varnish. However, for the antifouling purpose, it is often desired or preferred to formulate the composition with the present varnish and other antifouling agent. Such agent may be of any type customarily used for the intended object as, for example, metallic copper, copper compounds (e.g. cupric hydroxide, cuprous oxide, cuprous thiocyanate), tributyl tin compounds (e.g. bis tributyl tin oxide, tributyl tin fluoride, tributyl tin $\alpha,\alpha'$-dibromosuccinate,) triphenyl tin compounds (e.g. triphenyl tin hydroxide, triphenyl tin fluoride, triphenyl tin chloride, triphenyl tin $\alpha,\alpha'$-dibromosuccinate), and sulfur compounds (e.g. tetramethylthiuram disulfide, zinc dimethyl dithiocarbamate, manganese ethylene bisdithiocarbamate, zinc ethylene bisdithiocarbamate). Of course, any of the conventional dissolving aids as, for example, rosin, may be freely added thereto.

The amounts of these materials may be selected in any desired levels, providing giving no adverse effect on the film-forming of the resinous vehicle of the present invention. In contrast to the heretofore known antifouling paints, the present coating composition has the characteristic that after coating, gradual hydrolysis and decomposition of the coating occurs and hence the antifouling agent contained in the film can be effectively utilized to the last. Whereas, in the conventional type of composition, only the toxicant contained in the vicinity of film surface is utilized for the intended object through diffusion and dissolution thereof. Furthermore, in the conventional type of coating, the coating turns to skelton structure with the dissolution of antifouling agent contained, whereas in the present coating, the coating is getting smoother and flatter with sailing, and the antifouling effect continues to last for a longer period of time as compared with those of the conventional ones. Thus, the antifouling paint of the present invention is quite unique and will change the established antifouling concept in near future.

The invention shall be now more fully explained in the following Examples and Comparative examples. Unless otherwise being stated, part and % are on weight basis.

EXAMPLE 1

Into a four-necked flask equipped with reflux condenser, decanter and stirrer, were placed 100 parts of copper 12-hydroxy stearate (abbreviated as Cu 12-HO stearate), 245.5 parts of phthalic anhydride and 25 parts of toluene, and the mixture was heated to 100° C. Next, 191 parts of 1,6-hexanediol and 1 part of dibutyl tin oxide (catalyst) were added, the mixture was heated under a nitrogen stream to 160° C. and the polycondensation reaction was continued, while removing the formed water, for 8 hours. With the progress of the reaction, the temperature of the system rose and the final temperature reached 180° C. Thereafter, the reaction mixture was allowed to cool to 110° C. and was diluted with 263 parts of methyl isobutyl ketone to obtain a dark green varnish (V-1) (solid content 62.7%, Gardner viscosity G, acid value of solid 9.7) In the determination of acid value, titration with 0.5N KOH/-methanol solution was carried out using Methyl Red as indicator.

The solvent was removed from the varnish to obtain solid polyester resin, whose Tg measured by using TMA-30 manufactured by Shimazu Seisakusho (hereinafter the same) was −5° C. and number-average molecular weight was 1400.

EXAMPLE 2

Using the same procedures of Example 1, 100 parts of copper 12-hydroxy stearate, and 41 parts of phthalic anhydride were reacted at 160° C. in 10 parts of xylene in the presence of 0.2 part of dibutyl tin oxide under nitrogen stream. Thereafter, the reaction mixture was diluted with 50 parts of tetrahydrofuran to obtain dark green varnish (V-2) (solid content 68.8%; Gardner viscosity P; acid value of solid 9.5). Tg and number-average molecular weight of this polymer were 25° C. and 1200, respectively.

EXAMPLE 3

The procedures of Example 1 were repeated, excepting using 101 parts of zinc 12-hydroxy stearate (abbreviated as Zn 12-HO stearate), 246 parts of phthalic anhydride, 166.4 parts of neopentylglycol, 25 parts of toluene, 1 part of dibutyl tin oxide and 236 parts of methyl isobutyl ketone (as diluent), and a clear varnish (V-3) whose solid content was 65.4%, Gardner viscosity J and acid value of solid 9.6 was obtained. Tg and number-average molecular weight of this polymer were 10° C. and 1400, respectively.

EXAMPLE 4

The procedures of Example 1 were repeated excepting using 38 parts of copper lactate, 245.5 parts of phthalic anhydride, 215 parts of dipropylene glycol, 25 parts of toluene, 1 part of dibutyl tin oxide, and 189 parts of methyl isobutyl ketone, to obtain a dark green varnish (V-4) having a solid content of 69.8%, Gardner viscosity of N and acid value of solid of 9.9. Tg and number-average molecular weight of this polymer were 15° C. and 1300, respectively.

EXAMPLE 5

The procedures of Example 1 were repeated excepting using 46 parts of zinc lactate, 148 parts of phthalic anhydride, 95 parts of adipic acid, 36 parts of trimethylol ethane, 128 parts of 1,3-butylenediol, 25 parts of toluene, 1 part of dibutyl tin oxide and 205 parts of methyl isobutyl ketone (diluent), to obtain a clear varnish (V-5) having the solid content of 65.3%, Gardner viscosity of V and acid value of solid of 10.0. Tg and number-average molecular weight of this polymer were 35° C. and 2900, respectively.

EXAMPLE 6

The same procedures of Example 1 were repeated excepting using 253 parts of phthalic anhydride, 24 parts of copper lactate, 50.4 parts of pentaerythritol, 105.4 parts of neopentyl glycol, 1 part of dibutyl tin oxide and 370 parts of methyl isobutyl ketone to obtain a dark green varnish (V-6) having the solid content of 50.3%, Gardner viscosity of T and acid value of solid of 9.6. Tg and number-average molecular weight of this polymer were 50° C. and 3500, respectively.

EXAMPLE 7

The procedures of Example 1 were repeated excepting using 263.3 parts of hexahydrophthalic anhydride, 28 parts of magnesium lactate, 4.5 parts of sodium lactate, 50.4 parts of pentaerythritol, 105.4 parts of neopentyl glycol, 1 part of dibutyl tin oxide and 200 parts of methyl isobutyl ketone to obtain a clear varnish (V-7) having the solid content of 65.3%, Gardner viscosity of S and acid value of solid of 9.7. Tg and number-average molecular weight of this polymer were 55° C. and 2300, respectively.

EXAMPLE 8

The same procedures of Example 1 were repeated excepting using 253 parts of phthalic anhydride, 83 parts of magnesium salt of mono(hydroxyhexyl)phthalate, 50.4 parts of pentaerythritol, 105.4 parts of neopentyl glycol, 1 part of dibutyl tin oxide and 345 parts of methyl isobutyl ketone to obtain a clear varnish (V-8) having the solid content of 55.4%, Gardner viscosity of U and acid value of solid of 9.4. Tg and number-average molecular weight of this polymer were 65° C. and 3600, respectively.

EXAMPLE 9

The procedures of Example 8 were repeated excepting using, in place of 83 parts of magnesium salt of mono(hydroxyhexyl)phthalate, 90 parts of zinc salt of mono(hydroxyhexyl) phthalate, to obtain a clear varnish (V-9) having the solid content of 54.8%, Gardner viscosity of U and acid value of solid of 9.6. Tg and number-average molecular weight of this polymer were 70° C. and 3500, respectively.

Comparative varnish 1

According to the procedures of Example 1, a comparative varnish (1) was prepared by using 58.1 parts of phthalic anhydride, 12.1 parts of neopentylglycol, 9.6 parts of 1,6-hexanediol and 20.5 parts of trimethylol ethane. This varnish had a solid content of 50.4%, Gardner viscosity of P and acid value of solid of 9.7.

Comparative varnish 2

According to the procedures of Example 1, a comparative varnish (2) was prepared by using 54.9 parts of phthalic anhydride and 50.1 parts of 1,6-hexanediol). This varnish had a solid content of 65.3%, Gardner viscosity of J and acid value of solid of 9.7.

Comparative varnish 3

Into a solution of 50 parts of methyl methacrylate and 50 parts of tributyl tin methacrylate in 100 parts of toluene, were added dropwisely an initiator solution containing 0.8 part of benzoylperoxide at 90° C. over 3 hours, to obtain a varnish having the solid content of 50.4% and Gardner viscosity of N. This is not of polyester type, but is well-known hydrolyzable acrylic resin, and therefore, it was prepared just for comparison purpose herein.

In order to demonstrate the fact that the coating derived from the present varnish can be gradually hydrolyzed and dissolved out under alkaline conditions, the following tests were conducted.

Onto a glass plate (60 mm×50 mm), was applied the respective varnish obtained so as to give 100μ dry thickness, heated at 105° C. for 3 hours and measured the total weight (this being used as initial weight).

Thereafter, the glass plate was dipped into 350 cc of an aqueous alkaline solution (pH 10) and maintained therein at 40° C. for 18 hours. The glass plate was taken out of the bath, washed with water, dried and weighed again (this being used as final weight). Hydrolysis rate was calculated from the following:

$$\text{Hydrolysis rate} = \frac{\text{initial weight} - \text{final weight}}{\text{initial weight}}$$

The test results are shown in the following Table 1.

TABLE 1

| varnish | Hydrolysis rate |
|---|---|
| V-1 | 0.32 |
| V-2 | 0.30 |
| V-3 | 0.28 |
| V-4 | 0.30 |
| V-5 | 0.25 |
| V-6 | 0.24 |
| V-7 | 0.20 |
| V-8 | 0.22 |
| V-9 | 0.23 |
| comparative varnish | |

TABLE 1-continued

| varnish | Hydrolysis rate |
|---------|-----------------|
| 1 | 0.00 |
| 2 | 0.00 |
| 3 | 0.16 |

EXAMPLE 10

Using the same apparatus as stated in Example 1, were added 30 parts of xylene, 112 parts of copper 12-hydroxy stearate, 48 parts of phthalic anhydride and 70.5 parts of azelaic acid, and the mixture was heated to 100° to 110° C. and maintained at the same temperature for 30 minutes. Thereafter, 56.5 parts of neopentylglycol, 13 parts of trimethylol propane and 0.6 part of dibutyl tin oxide were added and the dehydration reaction was carried out under the same conditions as stated in Example 1. After completion of the reaction, the mixture was allowed to cool to 110° C., and a mixture of xylene/n-butanol (9/1) was added to obtain a varnish (V-10) (number-average molecular weight 4200, solid content 50.4%, viscosity N). Tg of the resin was 12° C.

EXAMPLE 11

Using the same apparatus as stated in Example 1, were added 30 parts of xylene, 90 parts of copper 12-hydroxy stearate, 120.5 parts of adipic acid, and 0.6 part of dibutyl tin oxide, and the mixture was heated to 160° C. The dehydration was carried out for 2 hours and the mixture was allowed to cool to 120° C. Thereafter, 44 parts of diethyleneglycol, 39 parts of neopentylglycol and 6.5 parts of trimethylol ethane were added and the mixture was heated to 160° C. and the dehydration was carried out for 10 hours. The reaction temperature was maintained at 160° to 180° C. After completion of the reaction, the mixture was allowed to cool to 100° C. and added with xylene to obtain a varnish (V-11) (viscosity P, solid content 59.8%). Tg of the resinous solid was 10° C. and the number-average molecular weight was 2600.

EXAMPLES 12 TO 50

Using the procedures of Example 1, 8, 10 or 11 with the materials shown in the following Table 2, various varnishes (V-12 to 50) were prepared, and their hydrolysis rates were determined and shown in Table 2. In these examples, a mixture of xylene and n-butanol (8/2) was used as a dilution solvent to adjust the solid % as shown in said Table.

EXAMPLES 51 TO 55 AND COMPARATIVE EXAMPLES 1 TO 2

Using the resinous varnishes V-1~V-5 obtained in Examples 1~5 and following the prescriptions given in the following Table 3, antifouling paints 1~5 of the present invention were prepared. For the comparison's sake, a commercialized, insoluble matrix type antifouling paint (Comparative Example 1) and an antifouling paint based on comparative varnish (3) (Comparative Example 2) were prepared as shown in the same Table. Onto a sand-blasted steel plate previously coated with an anti-corrosive paint, the respective paint was applied twice by brushing so as to give a coating of 100μ dry thickness each time. The following tests were carried out with these plates.

Antifouling test and result

The test plates were immersed in sea water for a defined period of time and the anti-fouling effects were determined. This test was conducted at Aioi Bay, Hyogo Pref. The results are shown in Table 4.

Erosive dissolution test and result

Test plate having a defined thickness of coating was attached to Discrotor, immersed in sea water (18° to 23° C.) and rotated at a constant speed (peripheral speed 35 knots) for 60 days (days and nights). Use-up rate of the coating was determined microscopically. The results are shown in Table 5.

TABLE 2

| Example No. | 12 | 13 | 14 | 15 | 16 | 17 | 18 | 19 | 20 | 21 | 22 | 23 |
|---|---|---|---|---|---|---|---|---|---|---|---|---|
| Raw materials used | | | | | | | | | | | | |
| Cu 12-HO stearate | 23.1 | 29.1 | 37.2 | 42.8 | 42.8 | 30.5 | 28.9 | 33.1 | 34.5 | 45.2 | 39.4 | |
| Zn 12-HO stearate | | | | | | | | | | | | 37.7 |
| Na 12-HO stearate | | | | | | | | | | | | |
| phthalic anhydride | 46.5 | 43.6 | 39.7 | 36.9 | 18.4 | 46.0 | | | | | | |
| succinic anhydride | | | | | | | 5.0 | 31.4 | 27.4 | | 18.9 | |
| maleic anhydride | | | | | | | | | | | | |
| hexahydro phth. anhyd. | | | | | | | | | | | 36.7 | |
| adipic acid | | | | | 18.3 | | 37.2 | 35.5 | | | | 13.8 |
| azelaic acid | | | | | | | | | | | | |
| trimethylolethane | | | | | | 4.3 | 2.1 | 2.0 | 2.5 | 2.2 | 1.9 | 2.2 |
| trimethylolpropane | 5.2 | 4.9 | 4.4 | 4.1 | 4.1 | | | | | | | |
| ethylene glycol | | | | | | 6.3 | | | | | | |
| neopentyl glycol | 25.2 | 22.4 | 18.7 | 16.2 | | 12.9 | | | | | | 7.4 |
| diethylene glycol | | | | | 16.4 | | 26.5 | 24.4 | 31.6 | 25.2 | 22.0 | 20.0 |
| benzoic acid | | | | | | | | | | | | |
| dibutyl tin oxide | 0.2 | 0.2 | 0.2 | 0.2 | 0.2 | 0.2 | 0.2 | 0.2 | 0.2 | 0.2 | 0.2 | 0.2 |
| method of Example | 1 | 1 | 1 | 1 | 10 | 1 | 10 | 10 | 1 | 1 | 1 | 10 |
| varnish No. | V-12 | V-13 | V-14 | V-15 | V-16 | V-17 | V-18 | V-19 | V-20 | V-21 | V-22 | V-23 |
| molecular weight | 4400 | 3800 | 4200 | 4600 | 5000 | 3200 | 2800 | 4400 | 4200 | 4200 | 4100 | 3800 |
| Tg | 15° C. | 10° C. | 18° C. | 20° C. | 20° C. | −5° C. | 10° C. | 15° C. | 15° C. | 25° C. | 20° C. | 10° C. |
| viscosity/solid % | P/55.4 | S/60.5 | R/61.2 | Q/49.8 | O/51.3 | T/58.8 | S/59.2 | R/54.8 | L/51.3 | N/50.5 | N/51.0 | M/49.3 |
| hydrolysis rate | 0.08 | 0.11 | 0.18 | 0.22 | 0.24 | 0.12 | 0.14 | 0.18 | 0.18 | 0.25 | 0.20 | 0.18 |

| Example No. | 24 | 25 | 26 | 27 | 28 | 29 | 30 | 31 | 32 | 33 | 34 |
|---|---|---|---|---|---|---|---|---|---|---|---|
| Raw materials used | | | | | | | | | | | |
| Cu 12-HO stearate | | | 41.5 | 28.1 | 23.7 | 32.4 | 31.4 | | 19.4 | 39.6 | 35.2 |
| Zn 12-HO stearate | 30.1 | 30.0 | | | | | | 20.4 | | | |
| Na 12-HO stearate | | | | | | | | | 5.7 | | |
| phthalic anhydride | 20.4 | 18.4 | | | | | | 47.0 | 44.0 | | 40.2 |

TABLE 2-continued

| Raw materials | | | | | | | | | | | |
|---|---|---|---|---|---|---|---|---|---|---|---|
| succinic anhydride | | | 26.2 | | 38.1 | 34.6 | 27.3 | | 31.7 | | |
| maleic anhydride | | | 5.0 | | | | | | | | |
| hexahydro phth. anhyd. | | | | | | | | | | | |
| adipic acid | 19.9 | 18.0 | | 12.4 | | | 9.3 | | | | |
| azelaic acid | | | | 31.9 | | | | | | | |
| trimethylolethane | 2.1 | 1.9 | 2.5 | 2.0 | | | | | | | |
| trimethylolpropane | | | | | | | | | | | |
| ethylene glycol | | | 8.1 | | | | | | | | |
| neopentyl glycol | | 28.1 | | 12.0 | | | | | | | 24.6 |
| diethylene glycol | 27.5 | | 16.7 | 13.5 | 38.2 | 33.0 | 32.0 | 32.6 | 30.9 | 28.7 | |
| benzoic acid | | 3.6 | | | | | | | | | |
| dibutyl tin oxide | 0.2 | 0.2 | 0.2 | 0.2 | 0.2 | 0.2 | 0.2 | 0.2 | 0.2 | 0.2 | 0.2 |
| method of Example | 10 | 10 | 1 | 11 | 1 | 1 | 10 | 1 | 1 | 1 | 1 |
| varnish No. | V-24 | V-25 | V-26 | V-27 | V-28 | V-29 | V-30 | V-31 | V-32 | V-33 | V-34 |
| molecular weight | 3200 | 1300 | 5000 | 2800 | 1300 | 1600 | 1100 | 1100 | 880 | 1200 | 1600 |
| Tg | 5° C. | 5° C. | 25° C. | 12° C. | 0° C. | 5° C. | −5° C. | 5° C. | −5° C. | 8° C. | 5° C. |
| viscosity/solid % | L/52.3 | L/60.8 | R/49.2 | N/61.1 | G/60.4 | L/61.5 | G/60.1 | J/58.4 | C/61.2 | H/60.2 | J/59.3 |
| hydrolysis rate | 0.16 | 0.28 | 0.18 | 0.10 | 0.29 | 0.31 | 0.32 | 0.21 | 0.28 | 0.30 | 0.28 |

| Example No. | 35 | 36 | 37 | 38 | 39 | 40 | 41 | 42 | 43 | 44 | 45 | 46 |
|---|---|---|---|---|---|---|---|---|---|---|---|---|
| Raw materials used | | | | | | | | | | | | |
| Cu.mono(hydroxyhexyl) maleate* | | | | | | 24.3 | 21.2 | | | | | |
| Cu.mono(hydroxydiethyl ether) maleate* | | | | | | | | | 30.3 | 30.8 | | |
| Cu.mono(hydroxydiethyl ether) succinate* | | | | | | | | | | | 23.0 | 21.1 |
| Cu ricinoleate | | 31.3 | 34.2 | 33.8 | | 41.1 | | | | | | |
| Zn ricinoleate | 20.3 | | | | | | | | | | | |
| Cu ricinoelaidate | | | | | 47.7 | | | | | | | |
| adipic acid | | | | | | | | | | | | |
| phthalic anhydride | 47.1 | | | | | | 9.2 | 43.7 | | | | |
| succinic anhydride | | 27.4 | 31.7 | 34.2 | | 25.0 | | | 36.8 | 33.0 | 34.8 | 36.5 | 40.3 |
| trimethylol ethane | | | 2.5 | | 8.5 | 4.7 | | | | 2.6 | | 2.9 | 6.1 |
| trimethylol propane | | | | 5.7 | | | | 2.5 | 3.2 | | | | |
| neopentyl glycol | | | | 15.3 | 24.9 | 15.7 | 15.4 | 19.2 | 22.4 | 23.9 | 24.7 | 16.7 |
| diethylene glycol | 32.6 | 32.0 | 31.6 | 11.0 | 18.9 | 4.3 | 14.1 | 19.6 | 11.7 | 10.5 | 12.9 | 15.8 |
| dibutyl tin oxide | 0.2 | 0.2 | 0.2 | 0.2 | 0.2 | 0.2 | 0.2 | 0.2 | 0.2 | 0.2 | | |
| method of Example | 1 | 10 | 1 | 1 | 1 | 1 | 8 | 8 | 8 | 8 | 8 | 8 |
| varnish No. | V-35 | V-36 | V-37 | V-38 | V-39 | V-40 | V-41 | V-42 | V-43 | V-44 | V-45 | V-46 |
| molecular weight | 1100 | 1200 | 4400 | 4200 | 3800 | 2800 | 3200 | 3400 | 3700 | 920 | 3800 | 5200 |
| Tg | 2° C. | −7° C. | 8° C. | 5° C. | −5° C. | 0° C. | 5° C. | 7° C. | 5° C. | −10° C. | 10° C. | 12° C. |
| viscosity/solid % | H/61.3 | F/58.6 | K/50.2 | L/49.8 | R/54.2 | O/56.3 | N/54.3 | L/55.8 | L/54.2 | L/60.3 | N/56.3 | R/50.3 |
| hydrolysis rate | 0.17 | 0.28 | 0.15 | 0.14 | 0.32 | 0.28 | 0.25 | 0.22 | 0.14 | 0.24 | 0.10 | 0.07 |

| Example No. | 47 | 48 | 49 | 50 |
|---|---|---|---|---|
| Raw materials used | | | | |
| Cu.mono(hydroxyhexyl) maleate* | | | | |
| Cu.mono(hydroxydiethyl ether) maleate* | | | 8.4 | |
| Cu.mono(hydroxydiethyl ether) succinate* | 18.3 | 24.5 | 16.8 | 21.6 |
| Cu ricinoleate | | | 7.5 | |
| Zn ricinoleate | | | | |
| Cu ricinoelaidate | | | | |
| adipic acid | | | | |
| phthalic anhydride | | 13.3 | | |
| succinic anhydride | 41.0 | 27.6 | 37.6 | 34.3 |
| trimethylol ethane | | | | 2.7 |
| trimethylol propane | | | | |
| neopentyl glycol | 16.1 | 12.6 | 14.7 | 33.9 |
| diethylene glycol | 24.6 | 22.0 | 22.5 | |
| dibutyl tin oxide | | | | |
| method of Example | 8 | 8 | 8 | 8 |
| varnish No. | V-47 | V-48 | V-49 | V-50 |
| molecular weight | 1000 | 980 | 1200 | 3600 |
| Tg | −5° C. | −10° C. | 0° C. | 5° C. |
| viscosity/solid % | N/61.2 | H/58.3 | I/60.3 | S/60.4 |
| hydrolysis rate | 0.12 | 0.19 | 0.20 | 0.17 |

*Cu.mono(hydroxyhexyl) maleate (HO—(CH$_2$)$_6$—OOC—CH=CH—COO—)$_2$Cu
*Cu.mono(hydroxydiethylether) maleate (HO—CH$_2$CH$_2$OCH$_2$CH$_2$OOC—CH=CH—COO—)$_2$Cu
*Cu.mono(hydroxydietheylether) succinate (HO—CH$_2$CH$_2$OCH$_2$CH$_2$OOC—CH$_2$CH$_2$—COO—)$_2$Cu

TABLE 3

| | Prescription of antifouling paints (unit: weight %) | | | | | | |
|---|---|---|---|---|---|---|---|
| | Example | | | | | Compara. Exam. | |
| | 51 | 52 | 53 | 54 | 55 | 1 | 2 |
| resinous varnish V-1 | 45 | | | | | | |

TABLE 3-continued

| | Prescription of antifouling paints (unit: weight %) | | | | | | |
|---|---|---|---|---|---|---|---|
| | Example | | | | | Compara. Exam. | |
| | 51 | 52 | 53 | 54 | 55 | 1 | 2 |
| V-2 | | 40 | | | | | |
| V-3 | | | 60 | | | | |
| V-4 | | | | 45 | | | |
| V-5 | | | | | 40 | | |
| compara. varnish 3 | | | | | | | 50 |
| WW rosin | | | | | | 7 | |
| vinyl chloride resin VYHH | | | | | | 7 | |
| dioctyl phthalate | | | | | | 2 | |
| cuprous oxide | 35 | 40 | | 30 | 40 | 35 | 35 |
| triphenyl tin hydroxide | 5 | | 5 | | | 5 | |
| triphenyl tin chloride | | | | 5 | | | |
| tributyl tin fluoride | | | 10 | | | 3 | |
| colcothar | 5 | 5 | | 5 | 5 | 10 | 5 |
| zinc white | | | 20 | | | | |
| methyl isobutyl ketone | 5 | 5 | 5 | 5 | 5 | 15 | |
| xylene | 5 | 10 | | 10 | 10 | 16 | 10 |
| total | 100 | 100 | 100 | 100 | 100 | 100 | 100 |

TABLE 4

| Antifouling test (surface area % adhered with submarine livings) | | | | | | | |
|---|---|---|---|---|---|---|---|
| immersed months | 3 | 6 | 9 | 12 | 18 | 24 | 30 |
| Example 51 | 0 | 0 | 0 | 0 | 0 | 0 | 0 |
| Example 52 | 0 | 0 | 0 | 0 | 0 | 0 | 0 |
| Example 53 | 0 | 0 | 0 | 0 | 0 | 0 | 0 |
| Example 54 | 0 | 0 | 0 | 0 | 0 | 0 | 0 |
| Example 55 | 0 | 0 | 0 | 0 | 0 | 0 | 0 |
| Comp. Exam. 1 | 0 | 0 | 0 | 5 | 80 | 100 | 100 |
| Comp. Exam. 2 | 0 | 0 | 0 | 0 | 5 | 20 | 60 |

TABLE 5

| | Coating use-up rate* | | |
|---|---|---|---|
| | initial film thickness | film thickness after test | Use-up rate |
| Exam. 51 | 210μ | 145μ | 0.31 |
| Exam. 52 | 220 | 135 | 0.39 |
| Exam. 53 | 200 | 155 | 0.22 |
| Exam. 54 | 190 | 145 | 0.24 |
| Exam. 55 | 200 | 160 | 0.20 |
| Comp. Ex. 1 | 200 | 200 | 0.0 |

TABLE 5-continued

| | Coating use-up rate* | | |
|---|---|---|---|
| | initial film thickness | film thickness after test | Use-up rate |
| Comp. Ex. 2 | 190 | 150 | 0.21 |

*Use-up rate = $\dfrac{\text{initial film thickness} - \text{film thickness after test}}{\text{initial film thickness}}$ From the foregoing, it is very clear that the present antifouling paint has an excellent polishing effect.

EXAMPLES 56 TO 103

Using the resinous varnishes V-10 to V-50 obtained in Examples 10 to 50 and following the prescriptions given in Table 6, antifouling paints were prepared. The similar antifouling tests and erosive dissolution tests as stated in Examples 51~55, were repeated with these paints and the results were shown in the following Table 7 and Table 8.

In the following Table 6, ZDMC stands for zinc dimethyl dithiocarbamate; TMT for tetramethyl thiuram disulfide; MANEB for manganese ethylene bisdithiocarbamate; and ZINEB for zinc ethylene bisdithiocarbamate.

TABLE 6

| | Prescription of antifouling paints (unit: weight %) | | | | | | | | | | | | | |
|---|---|---|---|---|---|---|---|---|---|---|---|---|---|---|
| | Example | | | | | | | | | | | | | |
| | 56 | 57 | 58 | 59 | 60 | 61 | 62 | 63 | 64 | 65 | 66 | 67 | 68 | 69 |
| resinous varnish V-10 | 40 | | | | | | | | | | | | | |
| V-11 | | 35 | | | | | | | | | | | | |
| V-12 | | | 40 | 40 | | | | | | | | | | |
| V-13 | | | | | 35 | 40 | | | | | | | | |
| V-14 | | | | | | | | | 35 | | | | | |
| V-15 | | | | | | | | | | 40 | | | | |
| V-16 | | | | | | | | | | | 40 | | | |
| V-17 | | | | | | | | | | | | 35 | | |
| V-18 | | | | | | | | | | | | | 35 | |
| V-19 | | | | | | | | | | | | | | 40 |
| V-20 | | | | | | | | | | | | | 40 | 40 |
| V-21 | | | | | | | | | | | | | | |
| V-22 | | | | | | | | | | | | | | |
| V-23 | | | | | | | | | | | | | | |
| V-24 | | | | | | | | | | | | | | |
| cuprous thiocyanate | | | | 20 | | | | | 15 | | | | 15 | |
| cuprous oxide | 25 | 10 | 35 | | 35 | | 40 | 35 | | | 35 | 35 | | 20 |
| ZDMC | | | | | | | | | | | | | | |
| TMT | | | | | | | | | | 10 | | | | |
| MANEB | | | 5 | | | | 5 | | | | | | | |
| ZINEB | | 8 | 5 | | | 5 | | | 10 | 10 | | | 10 | |
| triphenyl tin hydroxide | | 10 | | 5 | 10 | 5 | | | | 5 | 10 | 10 | 5 | |
| triphenyl tin chloride | | | | | | | | | | | | 5 | | 5 |

TABLE 6-continued

| | | | | | | | | | | | | | | |
|---|---|---|---|---|---|---|---|---|---|---|---|---|---|---|
| tributyl tin fluoride | | | | 5 | | 10 | | | 5 | | | | 5 | |
| colcothar | 5 | 5 | 5 | | 5 | | | | | | 5 | 5 | | |
| zinc white | 20 | 20 | | 15 | | 25 | 10 | 10 | 15 | 20 | | | 15 | 20 |
| xylene | 10 | 12 | | 15 | 15 | 15 | 15 | 10 | 10 | 20 | 15 | | 10 | 15 |
| white spirit | | | 10 | | | | | | | | | 10 | | |
| total | 100 | 100 | 100 | 100 | 100 | 100 | 100 | 100 | 100 | 100 | 100 | 100 | 100 | 100 |

| | Example | | | | | | | | | | | | | |
|---|---|---|---|---|---|---|---|---|---|---|---|---|---|---|
| | 70 | 71 | 72 | 73 | 74 | 75 | 76 | 77 | 78 | 79 | 80 | 81 | 82 | 83 |
| resinous varnish V-20 | | | | | | | | | | | | | | |
| V-21 | 40 | 45 | | | | | | | | | | | | |
| V-22 | | | 60 | | | | | | | | | | | |
| V-23 | | | | 40 | | | | | | | | | | |
| V-24 | | | | | 40 | | | | | | | | | |
| V-25 | | | | | | 50 | | | | | | | | |
| V-26 | | | | | | | 40 | | | | | | | |
| V-27 | | | | | | | | 50 | | | | | | |
| V-28 | | | | | | | | | 40 | 40 | | | | |
| V-29 | | | | | | | | | | | 35 | 40 | | |
| V-30 | | | | | | | | | | | | | 35 | 50 |
| V-31 | | | | | | | | | | | | | | |
| V-32 | | | | | | | | | | | | | | |
| V-33 | | | | | | | | | | | | | | |
| V-34 | | | | | | | | | | | | | | |
| cuprous thiocyanate | | 10 | | | | | | | | | 20 | | | |
| cuprous oxide | 35 | | | 35 | 50 | 35 | 35 | | 35 | | | | 10 | |
| ZDMC | | | | | | | | | | 15 | 5 | | | |
| TMT | | | | | | | | | | | | 15 | | |
| MANEB | 5 | | | | | | | 5 | | | | 5 | | 5 |
| ZINEB | | 10 | | | | | 5 | 5 | | | | 5 | 8 | 5 |
| triphenyl tin hydroxide | | | 5 | 5 | | | | 5 | 5 | 5 | 5 | 5 | 10 | 5 |
| triphenyl tin chloride | | | | 5 | | | | | | | 5 | | | |
| tributyl tin fluoride | | | 10 | 5 | | | | 10 | | 5 | 5 | 5 | | 10 |
| colcothar | 5 | | | | 5 | 5 | 5 | | 5 | | | | 5 | |
| zinc white | | 25 | 20 | | | | | 10 | 5 | 20 | 15 | 15 | 20 | 10 |
| xylene | 15 | 10 | 5 | 10 | 5 | 10 | 15 | 15 | 10 | 15 | 10 | 10 | 12 | 15 |
| white spirit | | | | | | | | | | | | | | |
| total | 100 | 100 | 100 | 100 | 100 | 100 | 100 | 100 | 100 | 100 | 100 | 100 | 100 | 100 |

| | Example | | | | | | |
|---|---|---|---|---|---|---|---|
| | 84 | 85 | 86 | 87 | 88 | 89 | 90 |
| resinous varnish V-23 | | | | | | | |
| V-24 | | | | | | | |
| V-25 | | | | | | | |
| V-26 | | | | | | | |
| V-27 | | | | | | | |
| V-28 | | | | | | | |
| V-29 | | | | | | | |
| V-30 | | | | | | | |
| V-31 | 45 | | | | | | |
| V-32 | | 45 | | | | | |
| V-33 | | | 45 | | | | |
| V-34 | | | | 45 | | | |
| V-35 | | | | | 35 | | |
| V-36 | | | | | | 35 | |
| V-37 | | | | | | | 40 |
| cuprous thiocyanate | | | | | | | |
| cuprous oxide | | 25 | | 25 | 40 | | 35 |
| ZDMC | 10 | | 10 | | | | |
| TMT | 5 | | 5 | | | 10 | |
| MANEB | | | | | | | 5 |
| ZINEB | | | | | | 10 | |
| triphenyl tin hydroxide | 5 | | 5 | | | | |
| triphenyl tin chloride | | | | | | 5 | |
| tributyl tin fluoride | 10 | 5 | 10 | 5 | | | |
| colcothar | | | | | | | 5 |
| zinc white | 15 | 15 | 15 | 15 | 10 | 20 | |
| xylene | 10 | 10 | 10 | 10 | 15 | 20 | 15 |
| white spirit | | | | | | | |
| total | 100 | 100 | 100 | 100 | 100 | 100 | 100 |

| | Example | | | | | | | | | | | | |
|---|---|---|---|---|---|---|---|---|---|---|---|---|---|
| | 91 | 92 | 93 | 94 | 95 | 96 | 97 | 98 | 99 | 100 | 101 | 102 | 103 |
| resinous varnish V-36 | | | | | | | | | | | | | |
| V-37 | | | | | | | | | | | | | |
| V-38 | 35 | | | | | | | | | | | | |
| V-39 | | 40 | | | | | | | | | | | |
| V-40 | | | 40 | | | | | | | | | | |
| V-41 | | | | 40 | | | | | | | | | |
| V-42 | | | | | 40 | | | | | | | | |
| V-43 | | | | | | 40 | | | | | | | |
| V-44 | | | | | | | 35 | | | | | | |

TABLE 6-continued

| | | | | | | | | | | | | |
|---|---|---|---|---|---|---|---|---|---|---|---|---|
| V-45 | | | | | | | 40 | | | | | |
| V-46 | | | | | | | | 50 | | | | |
| V-47 | | | | | | | | | 30 | | | |
| V-48 | | | | | | | | | | 30 | | |
| V-49 | | | | | | | | | | | 30 | |
| V-50 | | | | | | | | | | | | 30 |
| cuprous thiocyanate | | | 15 | | 20 | | 10 | | | | | |
| cuprous oxide | 10 | 35 | | | 10 | | 10 | | 40 | 40 | 40 | 40 |
| ZDMC | | | | | 5 | | | 10 | | | | |
| TMT | | | 10 | 10 | | 10 | 5 | | | | | |
| MANEB | | | | 5 | | | | | | | | |
| ZINEB | 8 | | | | 10 | | | 5 | | | | |
| triphenyl tin hydroxide | 10 | 10 | 5 | 5 | | 5 | | | 5 | 5 | 5 | 5 |
| triphenyl tin chloride | | | | 5 | | 5 | 5 | | | | | |
| tributyl tin fluoride | | | | 5 | | 5 | | 5 | | | | |
| colcothar | 5 | 5 | | | | 5 | | | 5 | | | |
| zinc white | 10 | | 20 | 20 | 25 | | 20 | 25 | | | | |
| xylene | 22 | 10 | 10 | 15 | 10 | 15 | 20 | 15 | 20 | 25 | 25 | 25 |
| white spirit | | | | | | | | | | | | |
| total | 100 | 100 | 100 | 100 | 100 | 100 | 100 | 100 | 100 | 100 | 100 | 100 |

TABLE 7

Antifouling test (surface area % adhered with submarine livings)

| immersed months | 3 | 6 | 9 | 12 | 18 | 24 | 36 |
|---|---|---|---|---|---|---|---|
| Example 56 | 0 | 0 | 0 | 0 | 0 | 0 | 0 |
| Example 57 | 0 | 0 | 0 | 0 | 0 | 0 | 0 |
| Example 58 | 0 | 0 | 0 | 0 | 0 | 0 | 0 |
| Example 59 | 0 | 0 | 0 | 0 | 0 | 0 | 0 |
| Example 60 | 0 | 0 | 0 | 0 | 0 | 0 | 0 |
| Example 61 | 0 | 0 | 0 | 0 | 0 | 0 | 0 |
| Example 62 | 0 | 0 | 0 | 0 | 0 | 0 | 5 |
| Example 63 | 0 | 0 | 0 | 0 | 0 | 0 | 0 |
| Example 64 | 0 | 0 | 0 | 0 | 0 | 0 | 0 |
| Example 65 | 0 | 0 | 0 | 0 | 0 | 5 | 10 |
| Example 66 | 0 | 0 | 0 | 0 | 0 | 0 | 5 |
| Example 67 | 0 | 0 | 0 | 0 | 0 | 0 | 0 |
| Example 68 | 0 | 0 | 0 | 0 | 0 | 0 | 0 |
| Example 69 | 0 | 0 | 0 | 0 | 0 | 0 | 0 |
| Example 70 | 0 | 0 | 0 | 0 | 0 | 0 | 0 |
| Example 71 | 0 | 0 | 0 | 0 | 0 | 0 | 0 |
| Example 72 | 0 | 0 | 0 | 0 | 0 | 0 | 0 |
| Example 73 | 0 | 0 | 0 | 0 | 0 | 0 | 0 |
| Example 74 | 0 | 0 | 0 | 0 | 0 | 0 | 0 |
| Example 75 | 0 | 0 | 0 | 0 | 0 | 0 | 0 |
| Example 76 | 0 | 0 | 0 | 0 | 0 | 0 | 0 |
| Example 77 | 0 | 0 | 0 | 0 | 0 | 0 | 0 |
| Example 78 | 0 | 0 | 0 | 0 | 0 | 0 | 0 |
| Example 79 | 0 | 0 | 0 | 0 | 0 | 0 | 0 |
| Example 80 | 0 | 0 | 0 | 0 | 0 | 0 | 0 |
| Example 81 | 0 | 0 | 0 | 0 | 0 | 0 | 0 |
| Example 82 | 0 | 0 | 0 | 0 | 0 | 0 | 0 |
| Example 83 | 0 | 0 | 0 | 0 | 0 | 0 | 0 |
| Example 84 | 0 | 0 | 0 | 0 | 0 | 0 | 0 |
| Example 85 | 0 | 0 | 0 | 0 | 0 | 0 | 0 |
| Example 86 | 0 | 0 | 0 | 0 | 0 | 0 | 0 |
| Example 87 | 0 | 0 | 0 | 0 | 0 | 0 | 0 |
| Example 88 | 0 | 0 | 0 | 0 | 0 | 0 | 0 |
| Example 89 | 0 | 0 | 0 | 0 | 0 | 0 | 0 |
| Example 90 | 0 | 0 | 0 | 0 | 0 | 0 | 0 |
| Example 91 | 0 | 0 | 0 | 0 | 0 | 0 | 0 |
| Example 92 | 0 | 0 | 0 | 0 | 0 | 0 | 0 |
| Example 93 | 0 | 0 | 0 | 0 | 0 | 0 | 0 |
| Example 94 | 0 | 0 | 0 | 0 | 0 | 0 | 0 |
| Example 95 | 0 | 0 | 0 | 0 | 0 | 0 | 0 |
| Example 96 | 0 | 0 | 0 | 0 | 0 | 0 | 0 |
| Example 97 | 0 | 0 | 0 | 0 | 0 | 0 | 0 |
| Example 98 | 0 | 0 | 0 | 0 | 0 | 5 | 10 |
| Example 99 | 0 | 0 | 0 | 0 | 0 | 0 | 5 |
| Example 100 | 0 | 0 | 0 | 0 | 0 | 0 | 0 |
| Example 101 | 0 | 0 | 0 | 0 | 0 | 0 | 0 |
| Example 102 | 0 | 0 | 0 | 0 | 0 | 0 | 0 |
| Example 103 | 0 | 0 | 0 | 0 | 0 | 0 | 0 |

TABLE 8

| | Coating use-up rate | | |
|---|---|---|---|
| | initial film thickness | film thickness after test | Use-up rate |
| Example 56 | 220μ | 165μ | 0.25 |
| Example 57 | 200 | 170 | 0.15 |
| Example 58 | 210 | 190 | 0.10 |
| Example 59 | 210 | 180 | 0.13 |
| Example 60 | 180 | 145 | 0.19 |
| Example 61 | 180 | 140 | 0.22 |
| Example 62 | 210 | 165 | 0.21 |
| Example 63 | 200 | 160 | 0.20 |
| Example 64 | 210 | 155 | 0.26 |
| Example 65 | 200 | 170 | 0.15 |
| Example 66 | 190 | 155 | 0.18 |
| Example 67 | 210 | 180 | 0.14 |
| Example 68 | 190 | 150 | 0.21 |
| Example 69 | 220 | 165 | 0.25 |
| Example 70 | 220 | 170 | 0.23 |
| Example 71 | 200 | 160 | 0.20 |
| Example 72 | 230 | 185 | 0.20 |
| Example 73 | 210 | 185 | 0.12 |
| Example 74 | 180 | 155 | 0.14 |
| Example 75 | 210 | 145 | 0.31 |
| Example 76 | 200 | 170 | 0.15 |
| Example 77 | 190 | 170 | 0.11 |
| Example 78 | 190 | 120 | 0.37 |
| Example 79 | 200 | 130 | 0.35 |
| Example 80 | 210μ | 125μ | 0.40 |
| Example 81 | 220 | 145 | 0.34 |
| Example 82 | 190 | 110 | 0.42 |
| Example 83 | 220 | 140 | 0.36 |
| Example 84 | 200 | 165 | 0.18 |
| Example 85 | 210 | 145 | 0.31 |
| Example 86 | 230 | 145 | 0.37 |
| Example 87 | 190 | 125 | 0.34 |
| Example 88 | 180 | 155 | 0.14 |
| Example 89 | 180 | 135 | 0.25 |
| Example 90 | 220 | 190 | 0.14 |
| Example 91 | 210 | 180 | 0.14 |
| Example 92 | 220 | 160 | 0.27 |
| Example 93 | 200 | 155 | 0.23 |
| Example 94 | 200 | 155 | 0.23 |
| Example 95 | 190 | 150 | 0.21 |
| Example 96 | 210 | 185 | 0.12 |
| Example 97 | 180 | 135 | 0.25 |
| Example 98 | 180 | 165 | 0.08 |
| Example 99 | 200 | 185 | 0.08 |
| Example 100 | 200 | 175 | 0.13 |
| Example 101 | 210 | 165 | 0.21 |
| Example 102 | 200 | 160 | 0.20 |
| Example 103 | 210 | 180 | 0.14 |

What is claimed is:

1. A process for preparing a hydrolyzable polyester resin comprising reacting polycarboxylic acid and polyhydric alcohol components, which is characterized in that a metallic salt of hydroxy carboxylic acid of the formula:

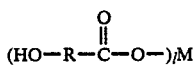

wherein R is a hydrocarbon residue or residue of a half ester of a dicarboxylic acid, M stands for monovalent to tetravalent metal belonging to anyone of the groups Ia, Ib, IIa, IIb, IVa, VIIb and VIII of the Periodic Table, and l is an integer corresponding to the valency of said metal M, is used as at least part of said polyhydric alcohol component and the polycondensation is effected at a temperature which is no more than the decomposition temperature of said metallic salt of hydroxy carboxylic acid.

2. The process according to claim 1, wherein R is a saturated aliphatic hydrocarbon residue of the formula:

$$-(C_aH_{2a})-$$

in which a is an integer from 1 to 38.

3. The process according to claim 2, wherein the saturated aliphatic hydrocarbon residue is the group of the formula:

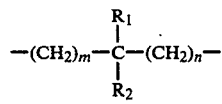

in which $R_1$ and $R_2$ each represents a member selected from hydrogen atom, alkyl having 1 to 10 carbon atoms and alkene having 2 to 10 carbon atoms, and m and n each is 0 or an integer from 1 to 16.

4. The process according to claim 3, wherein $R_1$ and $R_2$ each represents a member selected from hydrogen atom and alkyl having 1 to 8 carbon atoms, and m and n each is 0 or an integer from 1 to 10.

5. The process according to claim 1, wherein the hydroxy carboxylic acid is selected from lactic acid, hydracrylic acid, 12-hydroxy stearic acid and glycolic acid.

6. The process according to claim 1, wherein R is an unsaturated aliphatic hydrocarbon residue of the formula:

$$-(C_bH_{2b-2})-$$

in which b is an integer from 2 to 38.

7. Thre process according to claim 6, wherein the unsaturated aliphatic hydrocarbon residue is the group of the formula:

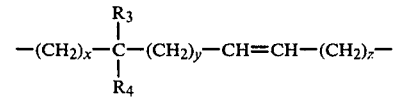

in which $R_3$ and $R_4$ each represents a member selected from hydrogen atom, alkyl having 1 to 10 carbon atoms and alkene having 2 to 10 carbon atoms, and x, y and z each is 0 or an integer from 1 to 10.

8. The process according to claim 7, wherein $R_3$ and $R_4$ each represents a member selected from hydrogen atom and alkyl having 1 to 8 carbon atoms, x is 0 or an integer from 1 to 4, y is 0 or an integer from 1 to 6 and z is 0 or an integer from 1 to 10.

9. The process according to claim 1, wherein the hydroxy carboxylic acid is selected from ricinoleic acid and ricinoelaidic acid.

10. The process according to claim 1, wherein R is a residue of half ester of aliphatic dicarboxylic acid of the formula:

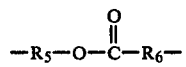

in which $R_5$ is a member selected from alkylene having 1 to 8 carbon atoms and ether bonding bearing alkylene having 4 to 8 carbon atoms, and $R_6$ is a member selected from saturated and unsaturated alkylenes having 2 to 4 carbon atoms.

11. The process according to claim 1, wherein the hydroxy carboxylic acid is a half ester of an aliphatic dicarboxylic acid selected from maleic anhydride, succinic anhydride, dimethyl maleic anhydride, and dimethyl succinic anhydride, with a polyol selected from ethylene glycol, propylene glycol, 1,3-butylenediol, 1,6-hexanediol, diethylene glycol, dipropylene glycol, neopentyl glycol, and triethylene glycol.

12. The process according to claim 1, wherein R is a residue of half ester of a saturated or unsaturated cyclic dicarboxylic acid of the formula:

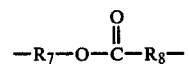

in which $R_7$ is a member selected from alkylene having 1 to 8 carbon atoms and ether bonding bearing alkylene having 4 to 8 carbon atoms, and $R_8$ is a member selected from saturated and unsaturated cyclic hydrocarbons having 6 to 7 atoms.

13. The process according to claim 1, wherein the hydroxy carboxylic acid is a half ester of a saturated or unsaturated cyclic dicarboxylic acid selected from phthalic anhydride, tetrahydrophthalic anhydride, hexahydro phthalic anhydride, and himic anhydride with a polyol selected from ethylene glycol, propylene glycol, 1,3-butylenediol, 1,6-hexanediol, diethylene glycol, dipropylene glycol, neopentyl glycol and triethylene glycol.

14. The process according to anyone of the preceding claims, wherein M is selected from the group consisting of Li, K, Na, Cu, Ag, Mg, Ca, Ba, Zn, Cd, Hg, Sn, Pb, Mn, Fe, Co and Ni.

15. The process according to claim 14, wherein M is selected from the group consisting of K, Na, Cu, Ag, Mg, Zn, Sn, Pb, Fe, Co and Ni.

16. The process according to claim 15, wherein M is selected from the group consisting of Na, Cu, Mg, Zn and Ni.

* * * * *